May 3, 1960     C. H. BROOKS     2,935,374
TEMPERATURE CONTROL IN VAPOR PHASE CHEMICAL REACTIONS
Filed July 22, 1957     2 Sheets-Sheet 1

Fig. 1

INVENTOR
CHARLES H. BROOKS
BY
Roberto Spindle
ATTORNEY

May 3, 1960  C. H. BROOKS  2,935,374
TEMPERATURE CONTROL IN VAPOR PHASE CHEMICAL REACTIONS
Filed July 22, 1957  2 Sheets-Sheet 2
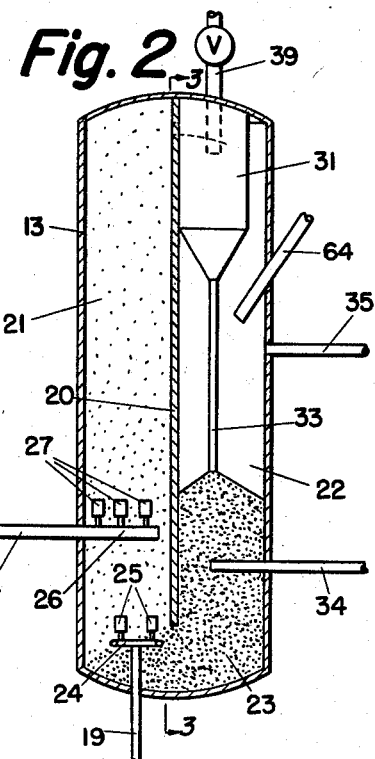
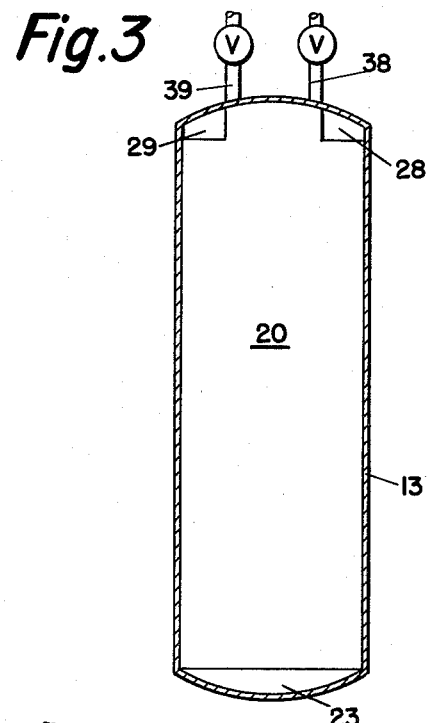
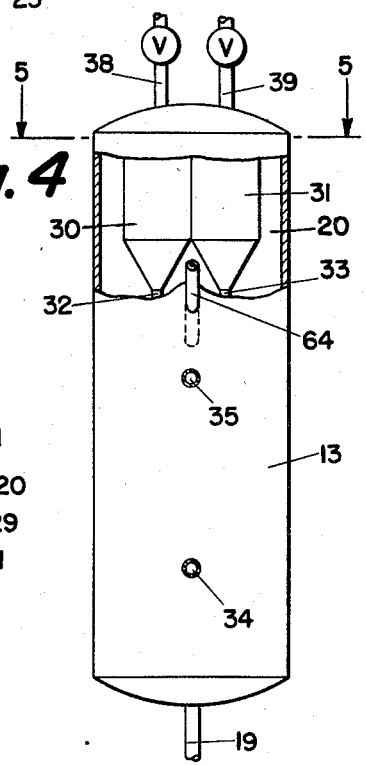
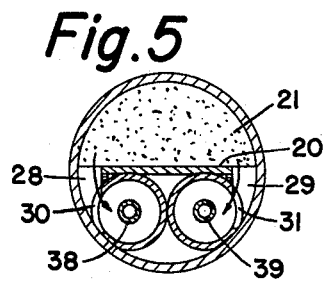
INVENTOR
CHARLES H. BROOKS
BY
ATTORNEY United States Patent Office 2,935,374
Patented May 3, 1960

2,935,374

TEMPERATURE CONTROL IN VAPOR PHASE CHEMICAL REACTIONS

Charles H. Brooks, Swarthmore, Pa., assignor to Sun Oil Company, Philadelphia, Pa., a corporation of New Jersey Application July 22, 1957, Serial No. 673,445

3 Claims. (Cl. 23—1)

This invention relates to a method for conducting chemical reactions in vapor phase under high pressures, and more particularly to a method for the control of temperatures in exothermic and endothermic reactions in order to insure, in the case of exothermic reactions, that temperatures in the reaction zone do not rise to an extent such that undesired side reactions will occur, and, in the case of endothermic reactions, to insure that the temperature does not fall below the reaction temperature.

In the past, proposals have been made to control reaction temperatures by passing the reactants through a moving bed of pebbles which, in the case of exothermic reactions, extract the heat of reaction from the reactants so as to maintain a fairly uniform temperature in the reaction zone. Such pebble-controlled processes are not in general adapted to catalytic reactions, since the pebbles do not present sufficient surface area. In addition, when the reaction is carried out at high pressures, it is well-nigh impossible to remove the pebbles from the system in order to burn off any carbonaceous contaminants resulting from side reactions without providing a series of lock chambers, with associated purging facilities to remove combustible gases from the interstices of the pebbles, all of which add to the investment required for the process. Alternatively, the contaminants may be burned off at the same pressure as is required for the reaction, but this necessitates provision of pressure vessels in the regeneration, with attendant great expense.

It is an object of this invention to provide a method for temperature control in chemical reactions conducted in the vapor phase by the use of particulate solids as heat abstractors or donors, which is equally well adapted to catalytic and noncatalytic reactions.

It is a further object of this invention to provide a means for continuously abstracting a controlled quantity of particulate solids from a reactor maintained under pressure for regeneration at atmospheric pressure in which no lock chambers or purging facilities are required.

In accordance with the present invention, the gaseous reactants are passed under pressure to a reactor which is divided by a wall into a reaction zone, and a solid particle temperature adjustment zone. The gases are passed upwardly through the reaction zone in contact with a fluidized mass of finely divided solids which may or may not be catalytic in nature. The upward velocity of the gases is somewhat above the terminal settling velocity of the solid particles so that the entire fluidized mass is in transport condition in the gas, in contrast to the static dense phase fluidized bed found in fluidized catalytic cracking processes. Nevertheless, sufficient turbulence is induced by the solid particles, if the upward flow of the gas is not excessive, to insure the uniform temperature throughout the reaction zone which is characteristic of dense phase fluidized processes.

The reaction products leaving the reaction zone, carrying suspended solid particles, are divided into two streams, each of which is passed to a separate cyclone within the reactor in which the major part of the suspended particles is removed from the gas stream. The recovered particles are passed downwardly through a dip leg into the temperature adjustment zone, in which they are contacted with a cold gas, in the case of an exothermic reaction, or with a hot gas, in the case of an endothermic reaction, in order to condition them for their role as temperature regulators in the reaction zone. From the bottom of the temperature adjustment zone the conditioned particles are picked up by a component of the feed, which enters the bottom of the reactor through a set of eduction nozzles, and are recycled to the reaction zone, in an amount and at a temperature sufficient to compensate for the gain or loss of heat during the reaction, and thus to maintain the temperature in the reaction zone constant at all times throughout the zone. The gas used to condition the particles may be an inert gas, such as nitrogen or flue gas, but preferably it is one of the gaseous reactants, in order to avoid the introduction of extraneous materials into the system. Preferably, also, the pressure in the temperature adjustment zone is slightly higher than in the reaction zone, in order to avoid seepage of other reactants thereinto from the reaction zone or the dip leg, whereby to avoid the presence of a reaction mixture in the temperature adjustment zone.

The presence of more than one cyclone in the reactor is an important fature of my invention, and provides the means for controlling the withdrawal of particles from the reactor for reconditioning for return thereto. The cyclones are so designed that when operating near the limit of their capacity there will be substantially complete removal of particles from the off-gas. Each of the off-take lines from the cyclones is separately valve controlled. It is the nature of cyclones that their efficiency increases with increasing throughput until a certain critical velocity, which depends upon the density of the gas, and the size and density of the solids being removed, is reached. When this critical velocity is exceeded, the carryover of solids from the cyclone increases markedly. Therefore, by throttling down the off-take line from one cyclone, the velocity through another cyclone may be increased to a value above the critical velocity such that any desired quantity of particles may be removed from the reactor through the latter cyclone. This method of control is particularly valuable when the amount of feed to the reactor varies from time to time, since even though the feed rate drops, so that the average velocity of the reactants through the reactor is lowered, the velocity of flow through one cyclone may always be maintained above its critical velocity by severe throttling of the flow from another cyclone, to insure a constant removal of solid particles from the reactor.

The off-gases from all cyclones are combined, cooled to condense reaction products, and are passed to a high-pressure separator from which unreacted gases are removed. The liquid product is then passed to a low-pressure separator from which gases which may have been dissolved in the reaction product at the pressure prevailing in the high pressure separator are separated from the liquid product. The liquid from the low pressure separator which contains the solid particles removed from the reactor, is then passed to a filter in which the solids are separated from the product. The solids are then taken to a regenerator in which accumulated deposits are burned off, and the regenerated solids are returned to the temperature adjustment zone as make-up for the solids removed with the gaseous reaction products.

In order that those skilled in the art may better understand the nature of my invention, it will be more fully described, as applied to a process for the production of naphthalene from an alkyl naphthalene-rich hydrocarbon mixture, in connection with the accompanying drawings, in which:

Fig. 1 is a diagrammatic flow sheet of a process embodying the present invention;

Fig. 2 is a vertical cross-sectional view of a reactor adapted for use in practicing the process of Fig. 1;

Fig. 3 is a vertical cross-sectional view of the reactor of Fig. 2 taken along the line 3—3 of Fig. 2; and Fig. 4 is a view, partially broken away, of the reactor of Fig. 2 as it would appear when viewed from the right-hand side of Fig. 2.

Fig. 5 is a top cross-sectional view of the reactor of Fig. 4 taken along line 5—5 of Fig. 4.

A hydrocarbon feed stock, obtained by thermally cracking a catalytically cracked petroleum fraction boiling within the range of 425° F. to 500° F., and which comprises about 85% by weight of alkylated naphthalenes and about 15% by weight of paraffins, is taken from storage through line 10, is heated in furnace 11 to a temperature of from about 1000° F. to about 1200° F., and preferably to about 1100° F., and is passed through line 12 to reactor 13, at a pressure of from about 100 p.s.i.g. to about 600 p.s.i.g., preferably about 300 p.s.i.g. A hydrogen containing gas, in an amount such that, when mixed with a recycle gas stream hereinafter described, will result in a mol ratio of hydrogen to hydrocarbon of from about 2:1 to about 20:1 in reactor 13, is taken from a source of supply through line 14, and is divided into two streams, one of which is passed via line 15 through furnace 11, while the other is taken through by-pass line 16 and is later admixed with the heated gas in line 15. If desired, a portion of the gas flowing through line 15 may be diverted via line 17 to admixture with the heated feed in line 12.

The combined streams of hydrogen from lines 15 and 16 are then mixed with a recycle stream of hydrogen from line 18 and are passed to reactor 13 through line 19. As may be seen from an inspection of Figs. 2, 3 and 4, reactor 13 is divided by partition 20 into a reaction zone 21 and a temperature adjustment zone 22. Partition 20 extends from the top of reactor 13 to a point near the bottom thereof, the space 23 between the bottom of partition 20 and the bottom reactor 13 constituting a passageway for the passage of finely divided solids from temperature adjustment zone 22 to reaction zone 21. Hydrogen line 19 terminates in distributor 24, equipped with eductor nozzles 25. Inflowing hydrogen will pick up finely divided solids, which, in the case of a process for catalytically dealkylating alkyl naphthalenes, would be preferably cobalt molybdate distended on alumina, from the bottom of the reactor, and will carry them upwardly past distributor 26 and eduction nozzles 27, from which the hydrocarbon component of the feed is injected into reactor 13. The reaction mixture, consisting of hydrocarbons, hydrogen, and catalyst particles, passes upwardly through reaction zone 21 at a speed greater than the terminal settling velocity of the catalyst in the gases. At the top of reactor 13, the reaction mixture divides into two streams which pass through ports 28 and 29 into cyclone separators 30 and 31, respectively. The major portion of the catalyst is separated from off-gases in the cyclone separators, and passes down through dip legs 32 and 33 into the temperature adjustment zone 22, in which it is cooled by direct heat exchange with a stream of hydrogen, introduced through line 34, to a temperature at which it will have sufficient heat capacity to absorb the heat of reaction in reaction zone 21, and thus prevent an excessive temperature rise therein. The exact temperature to which the catalyst should be cooled will vary, of course, with the ratio of catalyst to reaction mixture in reaction zone 21, but, in general, the catalyst should be cooled to about 300° F. to 500° F. Hydrogen used to cool the catalyst is withdrawn from temperature adjustment zone 22 via line 35, is passed through a cooler 36, and is returned to line 34. Pump 37 is placed in line 34 in order to maintain the pressure in temperature adjustment zone slightly higher than that in reaction zone 21, in order to prevent backflow of hydrocarbons into temperature adjustment zone 22, either from reaction zone 21 or from cyclones 30 and 31.

Off-gases, including reaction products, are recovered through lines 38 and 39, which connect with cyclones 30 and 31, respectively. Lines 38 and 39 are controlled by valves 40 and 41. Cyclones 30 and 31 are so designed that when valves 40 and 41 are fully open there will be little, if any, catalyst carried overhead through lines 38 and 39. If, however, one of the valves is throttled, the proportion of off-gases passing through the unthrottled cyclone will be increased, and the velocity of the gases passing therethrough may be raised above the critical velocity, so that catalyst will be carried out with the off-gases from that cyclone. By proper throttling of one of the valves, any desired amount of catalyst may be so removed. Another important advantage of catalyst removal in this manner is that the off-gases passing through the throttled valve will contain substantially no catalyst, and substantially all the catalyst removed from the reactor passes through the fully opened valve, thus preventing damage to either of the valve gates by erosion, as would occur if the catalyst-bearing gas stream passed through a partially opened valve.

After passing through valves 40 and 41, the off-gas streams are combined and taken through line 42 and condenser 43 to high pressure separator 44 from which a portion of the uncondensible gases are returned to the reactor through line 18 under the control of valve 45. A small amount of gases are bled off line 18 through line 46, which connects with line 35, to make up for losses in cooling gas by seepage from temperature adjustment zone 22 to reaction zone 21. A second portion of uncondensible gas is vented from separator 44 through line 47, under the control of valve 48, in order to avoid build-up of inert gases, such as methane, in the recycle gas stream.

The liquid product, and catalyst containing carbonaceous contaminants deposited on it during the reaction, is removed from separator 44 through line 49, is passed through pressure reducing valve 50, and is sent to flash tank 51, from which gases which are dissolved in the product at the pressure prevailing in separator 44 are vented through line 52. Liquid product is removed from flash tank 51 through line 53 and is taken to solids separating means 54, which may be a filter or centrifuge, from which liquid product is removed through line 55 for further processing to recover naphthalene. Catalyst is taken from separating means 54 through line 56 and is passed to regenerator 57, in which the carbonaceous contaminants are burned off by air from line 58, diluted with recycle flue gas from line 59, which has been cooled in cooler 60. Net flue gas is taken off regenerator 57 in line 61. Regenerated catalyst is taken from regenerator 57 through transfer line 62 to catalyst hopper 63, from which it is returned to temperature adjustment zone through line 64.

As an example of operating conditions which may be used in the commercial practice of my invention, the following data are given:

*Reactor dimensions*

| | |
|---|---|
| Diameter | 7′ 9″ |
| Height | 50′ |
| Partition height | 48′ |
| Cyclone diameter | 2′ 6″ |
| Overhead outlet line diameter | 1′ 3″ |
| Cyclone shell (cylindrical) height | 5′ |
| Cyclone shell (conical) height | 5′ |
| Dip leg diameter | 8″ |
| Cyclone ports | 7.5″–1′ 3″ |

Operating conditions

Oil feed—250 barrels/hr.—40° API, boiling 425-500° F., 15% paraffin
Hydrogen feed—1,725,000 s.c.f./hr.
Catalyst circulation in reaction zone—26.75 tons/hr.
Cooling gas—680,000 s.c.f./hr.
Pressure—300 p.s.i.g.
Reactor temperature—1100° F.
Catalyst—18% cobalt molybdate on alumina While the foregoing description has been directed principally to a process for dealkylating methyl naphthalenes, the basic principle of the invention is applicable to any process in which heat is given off or absorbed during reaction. For example, in a process for the oxidation of normally gaseous hydrocarbons, the hydrocarbons would be introduced through line 18, the oxygen through line 12, the cooling gas would be hydrocarbon, and the solid particulate material would be noncatalytic, such as Corhart. In endothermic reactions, the solid particles would be heated, instead of cooled, in the temperature adjustment zone, in order to furnish process heat. Therefore the appended claims should not be construed to be limited to a dealkylation process, but should be construed as applying to all reactions in which a gain or loss of heat is involved.

The invention claimed is:

1. A method for conducting chemical reactions in vapor phase which comprises flowing a suspension of particulate solid material in a gaseous reaction mixture upwardly through a reaction zone at a velocity greater than the terminal settling velocity of the solid material in the reaction mixture under reaction conditions of temperature and pressure, dividing the effluent from the reaction zone into a plurality of streams, passing each of said streams to a separate unthrottled cyclone separator of substantially the same throughput capacity as the other cyclones, thereby separating a major portion of the solid material from the reaction products, passing the so-separated solid material to a temperature adjustment zone, adjusting the temperature of the solid material to a value such as to compensate for the change in heat due to reaction in the reaction zone, recycling the temperature-adjusted material to the reaction zone, recovering reaction products from each of said unthrottled cyclone separators through product lines leading from each separator, subsequently throttling the flow from a first separator to a value such as to cause the velocity of flow in a second separator to be sufficiently high to carry out of the separator a minor portion of solid material, recovering a minor portion of solid material with the reaction products from said second separator, and adding solid material to the reaction zone-temperature adjustment zone system in an amount equivalent to that removed with the reaction products.

2. A method for conducting exothermic reactions in vapor phase which comprises flowing a suspension of particulate solid material in a mixture of gaseous reactants which react exothermically upwardly through a reaction zone at a velocity greater than the terminal settling velocity of the solid material in the reaction mixture under reaction conditions of temperature and pressure, dividing the effluent from the reaction zone into a plurality of streams, passing each of said streams to a separate unthrottled cyclone separator of substantially the same through-put capacity as the other cyclones, thereby separating a major portion of the solid material from the reaction products, passing the so-separated solid material to a cooling zone, cooling it therein to a temperature such that, when recycled to the reaction zone it will absorb at least a substantial amount of the heat of reaction, whereby to prevent an excessive temperature rise in the reaction zone, recycling the cooled solid material to the reaction zone, recovering reaction products from each of said unthrottled cyclone separators through product lines from each separator, subsequently throttling the flow from a first separator to a value such as to cause the velocity of flow in a second separator to be sufficiently high to carry out of the separator a minor portion of solid material, recovering a minor portion of solid material with the reaction products from said second separator, and adding solid material to the reaction zone-cooling zone system in an amount equivalent to that removed with the reaction products.

3. A reactor for effecting direct contact chemical reactions in vapor phase including in combination a vertical elongated shell, a vertical partition within the shell dividing the shell into a direct contact reaction zone and a temperature adjustment zone, a passageway located adjacent the bottom of the shell between the reaction zone and the temperature adjustment zone, a plurality of ports in said partition adjacent the upper end thereof connecting the reaction zone in fluid receiving relation with a plurality of cyclone separators positioned in the upper portion of the temperature adjustment zone, dip legs leading from each of said cyclone separators to the lower portion of said temperature adjustment zone, temperature adjustment means in said temperature adjustment zone, product lines leading from each of said cyclone separators, valves for controlling the flow through each of said product lines, means for introducing gaseous reactants into said direct contact reaction zone, and means for introducing particulate solid material into said temperature adjustment zone.

References Cited in the file of this patent

UNITED STATES PATENTS

| | | |
|---|---|---|
| 2,493,498 | Peery | Jan. 3, 1950 |
| 2,604,479 | Rollman | July 22, 1952 |
| 2,631,927 | Trainer | Nov. 17, 1953 |
| 2,799,095 | May | July 16, 1957 |